United States Patent [19]

Stawitz et al.

[11] Patent Number: 5,163,971
[45] Date of Patent: Nov. 17, 1992

[54] DYESTUFF MIXTURES OF METAL PHTHALOCYANINE AND PYRIDONE AZO REACTIVE DYES

[75] Inventors: Josef-Walter Stawitz, Odenthal-Glöbusch; Frank-Michael Stöhr, Odenthal-Osenau; Manfred Groll, Leverkusen; Karl-Josef Herd, Odenthal-Holz; Karl-Heinz Schündehütte, deceased, late of Leverkusen, all of Fed. Rep. of Germany, by Eva Schündehütte, heiress

[73] Assignee: Bayer Aktiengesellschaft, Leverkusen, Fed. Rep. of Germany

[21] Appl. No.: 701,249

[22] Filed: May 16, 1991

[30] Foreign Application Priority Data

May 24, 1990 [DE] Fed. Rep. of Germany ....... 4016712

[51] Int. Cl.$^5$ .......................... C09B 67/22; D06P 1/38
[52] U.S. Cl. ........................................... 8/549; 8/638; 8/641; 8/661; 8/684; 8/686; 8/688; 8/689; 8/917; 8/918; 8/924; 8/623
[58] Field of Search ................... 8/638, 639, 549, 661, 8/641

[56] References Cited

U.S. PATENT DOCUMENTS

| | | | |
|---|---|---|---|
| 3,994,906 | 11/1976 | Hegar | 546/291 |
| 4,039,523 | 8/1977 | Hegar | 534/635 |
| 4,078,885 | 3/1978 | Opitz et al. | 8/527 |
| 4,246,174 | 1/1981 | Groll | 8/661 |
| 4,745,187 | 5/1988 | Springer | 540/123 |

FOREIGN PATENT DOCUMENTS 3503747 8/1986 Fed. Rep. of Germany .

OTHER PUBLICATIONS

Japanese Abstract, Textiles:Paper:Cellulose, p. 8; Week 8639 JP-A2-61183361, Aug. 16, 1986, New Phthalocyanine Reactive Dye with Sulpho and Sulphamide GPS. With Fibre Reactive Pyrimidinyl and/or Vinyl or Precursor Substits.

*Primary Examiner*—A. Lionel Clingman
*Attorney, Agent, or Firm*—Sprung Horn Kramer & Woods

[57] ABSTRACT

Dyestuff mixtures containing one or more dyestuffs of the formula

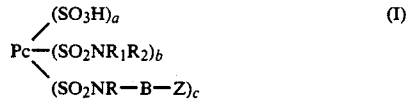
(I)

and one or more dystuffs of the formula

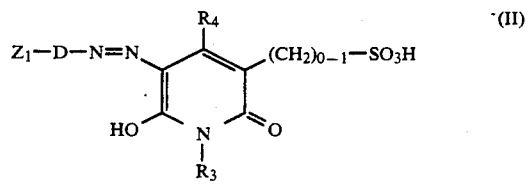
(II)

in which the substituents have the meanings given in the description are highly suitable for producing green cotton dyeings.

11 Claims, No Drawings

DYESTUFF MIXTURES OF METAL PHTHALOCYANINE AND PYRIDONE AZO REACTIVE DYES

The present invention relates to dyestuff mixtures containing one or more dyestuffs of the formula

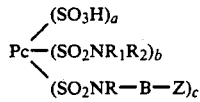  (I)

and one or more dyestuffs of the formula

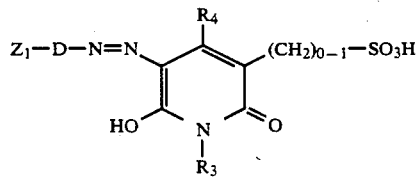  (II)

in which
Pc denotes the radical of a copper phthalocyanine or nickel phthalocyanine $R_1$, $R_2$ denote H, substituted or unsubstituted $C_1$-$C_4$-alkyl or together a 5- or 6-membered ring which may contain hetero atoms, R denotes H, substituted or unsubstituted alkyl, in particular H and $CH_3$, $C_2H_5$, B denotes a bridging member, preferably $C_1$-$C_6$-alkylene which is substituted or unsubstituted or interrupted by hetero atoms or hetero atom groups or denotes substituted or unsubstituted phenylene, a, b denote 0 to 3, c denotes 0.8 to 2, $a+b+c=3$ to 4, D denotes the radical of a diazo component, preferably substituted or unsubstituted phenylene or naphthylene, $R_3$, $R_4$ denote H, substituted or unsubstituted $C_1$-$C_6$-alkyl or substituted or unsubstituted phenyl, Z, $Z_1$ denote a fibre-reactive radical.

Suitable fibre-reactive radicals Z and $Z_1$, i.e. those reacting with the OH or NH groups of the fibre under dyeing conditions with the formation of covalent bonds, are in particular those containing at least one reactive substituent bound to a 5- or 6-membered aromatic-heterocyclic ring, for example a monoazine, diazine or triazine ring, in particular a pyridine, pyrimidine, pyridazine, pyrazine, triazine, oxazine or asymmetrical or symmetrical triazine ring, or bound to such a ring system containing one or more fused-on aromatic-carbocyclic rings, for example a quinoline, phthalazine, cinnoline, quinazoline, quinoxaline, acridine, phenazine and phenanthridine ring system.

Examples of suitable reactive substituents of the heterocycle are halogen (Cl, Br or F), ammonium, including hydrazinium, pyridinium, picolinium, carboxypyridinium, sulfonium, sulfonyl, azido($N_3$), thiocyanato, mercapto ether, hydroxy ether, sulfinic acid and sulfonic acid.

2,4-Difluorotriazin-6-yl, 2,4-dichlorotriazin-6-yl, monohalogeno-sym.-triazinyl radicals, in particular monochloro- and monofluorotriazinyl radicals which are substituted by alkyl, aryl, amino, monoalkylamino, dialkylamino, aralkylamino, arylamino, morpholino, piperidino, pyrrolidino, piperazino, alkoxy, aryloxy, alkylthio, arylthio, alkyl preferably being substituted or unsubstituted phenyl-$C_1$-$C_4$-alkyl, aralkyl preferably being substituted or unsubstituted phenyl-$C_1$-$C_4$-alkyl and aryl preferably being substituted or unsubstituted phenyl or naphthyl and preferred substituents for alkyl being halogen, hydroxyl, cyano, vinylsulfonyl, substituted alkylsulfonyl, dialkylamino, morpholino, $C_1$-$C_4$-alkoxy, vinylsulfonyl-$C_2$-$C_4$-alkoxy, substituted alkylsulfonyl-$C_2$-$C_4$-alkoxy, carboxyl, sulfo or sulfato and substituents for phenyl and naphthyl preferably being sulfo, $C_1$-$C_4$-alkyl, $C_1$-$C_4$-alkoxy, carboxyl, halogen, acylamino, vinylsulfonyl, substituted alkylsulfonyl, hydroxyl, amino, mono-, di- and trihalogenopyrimidinyl, for example 2,4-dichloro-, 2,4,5-trichloropyrimidin-4-yl, 2,6-difluoro-5-chloro and 6-fluoro-5-chloropyrimidin-4-yl can be mentioned as individual examples.

Furthermore vinylsulfonyl groups and derivatives thereof, for example —$SO_2$—$CH$=$CH_2$ and —$SO_2CH_2CH_2X$ where X denotes detachable groups (for example Cl, $OSO_3H$), may also be mentioned.

The reactive groups Z and $Z_1$, the radicals $R_1$ and $R_2$ and the radicals $R_3$ and $R_4$ can be identical or different.

In the case of heterocyclic radicals, the radicals Z and $Z_1$ are preferably bound to B via —NH— or —NR— or, if desired, to an aromatic ring C atom at D via a bridging member, the group —$SO_2CH_2CH_2X$ or —$SO_2CH$=$CH_2$ is preferably bound to an aromatic or aliphatic C atom at B or D.

Suitable radicals B are in particular phenylene which is unsubstituted or substituted by $C_1$-$C_4$-alkyl, $C_1$-$C_4$-alkoxy, halogen, in particular Cl, nitro, cyano, COOH, $SO_3H$, carboxamido, sulfonamido, acylamino, in particular $C_1$-$C_4$-alkylcarbonylamino or —$NHCONH_2$ or else $C_2$-$C_6$-alkylene.

The following radicals B may be mentioned as examples: 1,2-phenylene, 1,3-phenylene, 1,4-phenylene, 3-methyl-1,4-phenylene, 2-methyl-1,4-phenylene, 2-methyl-5-chloro-1,4-phenylene, 4-methoxy-1,3-phenylene, 3-methoxy-1,4-phenylene, 4-chloro-1,3-phenylene, 2-chloro-1,4-phenylene, 5-carboxamido-1,3-phenylene, 2-sulfo-1,4-phenylene, 4-sulfo-1,3-phenylene, 5-carboxyl-1,3-phenylene, 4-carboxyl-1,3-phenylene. Examples of alkylene radicals are:

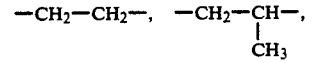

Preferred radicals $R_3$ are: H, a $C_1$-$C_6$-alkyl radical which is unsubstituted or substituted by OH, $SO_3H$, $OSO_3H$, $NH_2$, $CO_2H$, $NH(C_1$-$C_4$-alkyl), $C_1$-$C_4$-alkoxy, a cycloaliphatic $C_3$-$C_6$-hydrocarbon radical, a phenyl or hetaryl radical which is unsubstituted or substituted by $SO_3H$, $CO_2H$, $CH_3$, Cl, Br, $OCH_3$, $OC_2H_5$, $NH_2$, $NH(C_1$-$C_4$-alkyl).

Preferred radicals $R_4$ are: H, OH, a $C_1$-$C_4$-alkyl radical which is unsubstituted or substituted by Cl, OH, $SO_3H$, $OSO_3H$, $CO_2H$; a phenyl or benzyl radical which is unsubstituted or substituted by $SO_3H$, $CO_2H$, $CH_3$, Cl, Br, $OCH_3$, $OC_2H_5$, $NH_2$, $NH(C_1$-$C_4$-alkyl), or $CO_2H$, and D preferably represents a sulfo-containing radical of the benzene, azobenzene or naphthalene series and may contain further customary substituents, for example $SO_3H$, COOH, $C_1$-$C_4$-alkyl, Cl, Br, $C_1$-$C_4$-alkoxy, acylamino, such as $C_1$-$C_4$-alkylcarbonylamino, $C_1$-$C_4$-alkylsulfonylamino, substituted or unsubstituted phenylcarbonylamino, and ureido.

Preferred dyestuffs (I) and (II) are those having a fluoropyrimidyl reactive radical, in particular a 5-chloro-6-fluoropyrimid-4-yl radical.

Preferred dyestuffs (I) are those of the formula

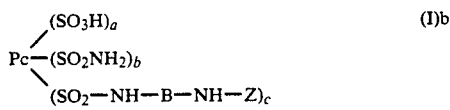
(I)b where
- B = $C_2$-$C_6$-alkylene or phenylene,
- Z = fluoropyrimidyl, in particular 5-chloro-2,6-difluoropyrimid-4-yl and 5-chloro-6-fluoropyrimid-4-yl,
- a = 1.5 to 3, preferably 1.5 to 2.5
- b = 0 to 1.5
- c = 0.8 to 2.0 and
- a + b + c = 3 to 4.

Particularly preferred dyestuffs are those of the formula

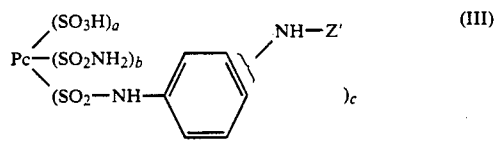
(III)

where
- Z' = fluoropyrimidyl, in particular 5-chloro-6-fluoropyrimid-4-yl and
- a = 1.5 to 3, preferably 1.5 to 2.5,
- b = 0 to 1.5
- c = 0.8 to 1.2 and
- a + b + c = 3 to 4.

Preferred dyestuffs (II) are those of the formula

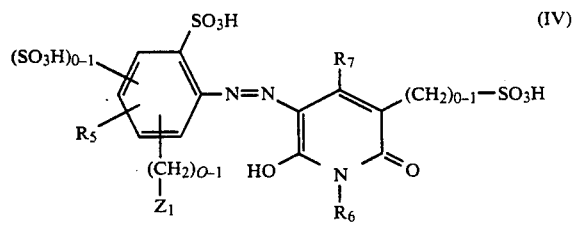
(IV)

where
- $R_5$ = H, $C_1$-$C_4$-alkyl, Cl,
- $R_6$, $R_7$ = $C_1$-$C_4$-alkyl.

The mixtures according to the invention can be present in solid, in particular pulverulent form or in granulate form. As a rule they additionally contain electrolyte salts, such as NaCl, KCl, $Na_2SO_4$ which may originate from the synthesis, furthermore buffer substances, such as alkali metal acetates, alkali metal phosphates or alkali metal hydrogen phosphates, or sodium borate. Furthermore, other substances customary for dyestuffs preparation can be present, for example hydrotropic agents, wetting agents, fixing agents, siccatives, fungicides, and dyeing assistants.

The mixtures can also be present as an aqueous or aqueous-organic solution, the pH of which is in general about 4 to 9.

The mixtures can additionally also contain fibre-reactive dyestuffs of different structure and shade by means of which mixed shades are obtainable in the usual manner.

Preferred mixtures are those containing the dyestuffs (I) and (II) as the only chromophoric reactive substances as well as mixtures of dyestuffs of the formulae Ib and IV.

The dyestuff mixtures according to the invention can be prepared in a manner known per se, such as, for example, by mixing the individual solid dyestuff components obtainable from the synthesis by salting out or spray dyeing of the synthesis solution, or by mixing the synthesis solutions of the individual dyestuff components, followed by joint isolation by means of salting out or spray-drying. In this operation, the customary above-mentioned additives can be added to the solutions themselves, if appropriate before their spray-drying, or to the solid individual components or their mixtures.

In the dyestuff mixtures according to the invention, the dyestuffs (I) and the dyestuffs (II) are in general present in a weight ratio of 95:5 to 5:95. The preferred mixing ratio is 70:30 to 30:70, in particular 60:40 to 40:60.

The dyestuffs (I) and (II) are known or analogous in their chemical structure to known dyestuffs, so that the dyestuffs not yet described per se can be prepared analogously to the dyestuffs described per se.

Dyestuffs (I) are described, for example, in DE-A 1,644,681, DE-A 2,853,823, DE-A 3,503,747 and DE-A 3,603,124.

Dyestuffs (II) are described, for example, in DE-A 2,162,612, DE-A 2,162,858 and DE-A 2,050,901.

The mixtures according to the invention are used for the dyeing and printing of hydroxyl- and amido-containing materials, in particular cellulose.

Combinations of phthalocyanine dyestuffs with yellow azo dyestuffs often have disadvantages. Thus, for example, phthalocyanine dyestuffs have completely different affinities from azo dyestuffs, which often leads to deviations from the desired hue or non-level dyeings. In some cases the dyestuffs are only present on the fibre in dichroic form, although this would not be expected given the properties of the individual components. In order to eliminate at least some of these disadvantages, very specific dyeing conditions have to be maintained. Deviation from this narrow range of conditions produces substantially poorer dyeings.

In contrast, the mixtures according to the invention surprisingly produce level solid shades on the fibre, which have a more attractive appearance and are readily usable in many dyeing processes.

The following may be mentioned:

Dyeing from long liquor a) with heating to 40° C. to 80° C. with the addition of sodium carbonate, sodium bicarbonate or NaOH b) at constant temperature, for example at 80° C. with the addition of sodium carbonate or sodium carbonate/NaOH, c) by the "all-in" method, i.e. dissolving the dyestuff mixture with alkali at 50° C. and then heating it to 80° C.

EXAMPLE 1

320 mg of a dyestuff mixture comprising 62% by weight of the phthalocyanine dyestuff of the formula

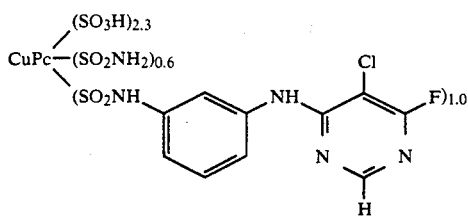

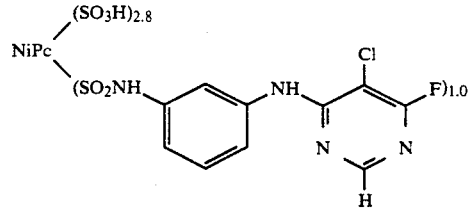

and 38% by weight of the azo dyestuff of the formula

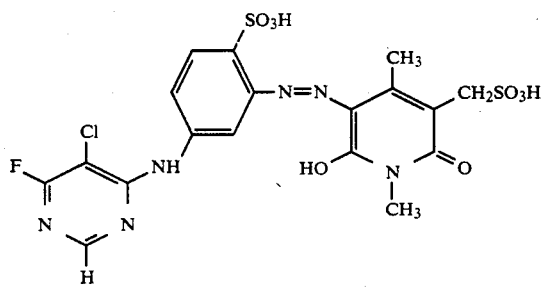

are dissolved in 200 ml of water. After addition of 10 g of common salt, 10 g of a knitted cotton fabric are added to the solution. The dye liquor is heated to 80° C. and maintained at 80° C. for half an hour with constant stirring. 2 ml of a 20% strength sodium carbonate solution and, after another 30 minutes 1 ml of a 10% strength sodium hydroxide solution are added to the dye bath, and the dyeing is completed at 80° C. over a period of 90 minutes. The dyed material is removed from the dye liquor, thoroughly rinsed first with cold and then with hot water until the rinsing liquor is no longer coloured. The dyed material is then treated with water at the boiling temperature two more times for ten minutes. A further rinsing process and drying at 60°–70° C. gives a knitted cotton fabric which has been dyed in a brilliant green shade.

EXAMPLE 2

Example 1 is repeated, preparing the dye liquor with the same amounts of dyestuff but adding sodium carbonate solution and sodium hydroxide solution already at 50° C. and then completing the dyeing by heating to 80° C., to give, after the same rinsing processes, a knitted cotton fabric having the same brilliant green shade as in Example 1.

EXAMPLE 3

The procedure of Example 1 or 2 is repeated, except that the phthalocyanine dyestuff of the formula is used, to give a brilliant green shade having excellent fastness properties.

EXAMPLE 4

The procedure of Example 1 or 2 is repeated, except that the phthalocyanine dyestuff of the formula

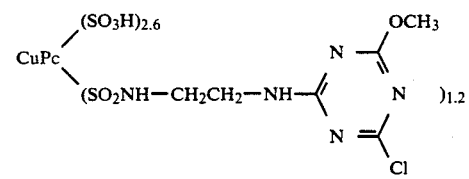

is used, to give a knitted cotton fabric in a brilliant green shade.

EXAMPLE 5

The procedure of Example 1 is repeated, except that the phthalocyanine dyestuff of the formula

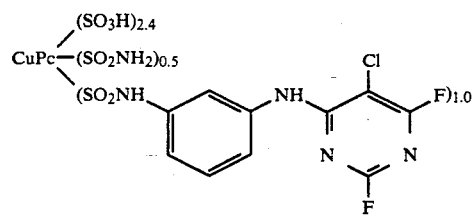

is used, to give a knitted cotton fabric in a brilliant green shade.

EXAMPLE 6

The solutions of 0.5 g of the phthalocyanine dyestuff of the formula

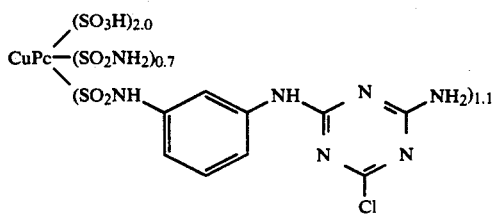

in 100 ml of hot water and 0.2 of the azo dyestuff of the formula

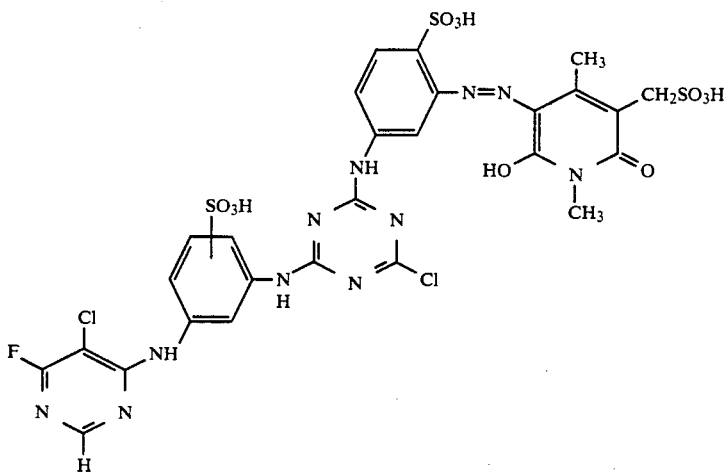

in 40 ml of hot water are poured into 150 ml of water together with 160 ml of 20% strength common salt solution and 4 ml of a 20% strength sodium carbonate solution. After addition of 20 g of a knitted cotton fabric, the dye liquor is maintained at 50° C. for 30 minutes with constant stirring, and then heated to 80° C. over a period of 30 minutes. At 80° C., 36 ml of a 20% strength sodium carbonate solution and 5.4 ml of a 10% strength sodium hydroxide solution are added, and the dyeing is completed at 80° C. over a period of 90 minutes. Rinsing and drying analogously to Example 1 give a knitted cotton fabric in brilliant green shades.

EXAMPLE 7

The procedure of Example 1 is repeated, except that the phthalocyanine dyestuff of the formula

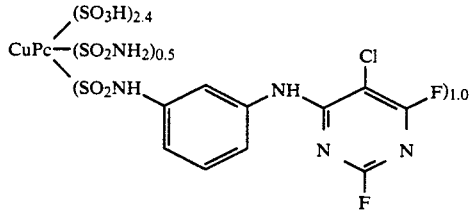

and the azo dyestuff of the formula

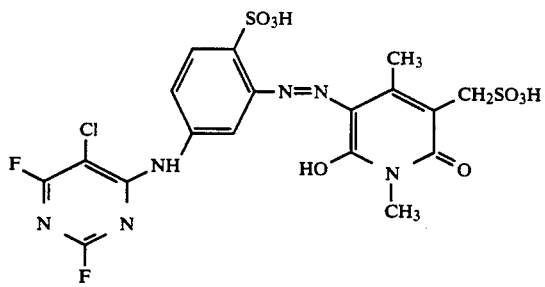

are used, to give a knitted cotton fabric which has been dyed in a brilliant green shade.

EXAMPLE 8

The procedure of Example 1 is repeated, except that the phthalocyanine dyestuff of the formula

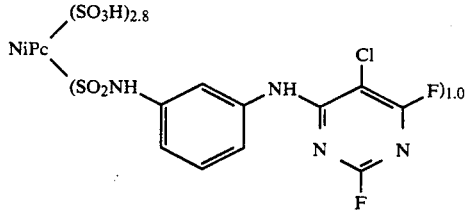

is used, to give a brilliant green shade having excellent fastness properties.

We claim:

1. Dyestuff mixtures containing one or more dyestuffs of the formula

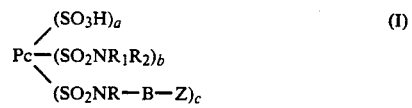

and one or more dyestuffs of the formula

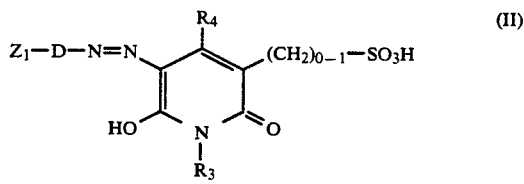

in which

Pc represents the radical of a copper phthalocyanine or nickel phthalocyanine;

$R_1$ and $R_2$ independently represent H or $C_{1-4}$-alkyl;

R represents H or alkyl;

B represents a bridging member selected from the group consisting of $C_{1-6}$-alkylene, phenylene, or phenylene which is substituted by $C_{1-4}$-alkyl, $C_{1-4}$-alkoxy, halogen, nitro, cyano, COOH, $SO_3H$, carboxamido, sulfonamido, or acylamino;

a and b independently represent 0 to 3;

c represents 0.8 to 2, wherein $a+b+c=3$ to 4;

D represents the radical of a diazo component;

$R_3$ and $R_4$ independently represent H, $C_{1-6}$-alkyl, $C_{1-6}$-alkyl which is substituted by OH, $SO_3H$, $OSO_3H$, $NH_2$, $CO_2H$, $NH(C_{1-4}$-alkyl), $C_{1-4}$- alkoxy, cycloaliphatic, $C_{3-6}$-hydrocarbon, phenyl, hetaryl, or phenyl or hetaryl substituted by $SO_3H$, $CO_2H$, $CH_3$, Cl, Br, $OCH_3$, $OC_2H_5$, $NH_2$, or $NH(C_{1-4}$-alkyl), phenyl, or phenyl which is substituted by $SO_3H$, $CO_2H$, $CH_3$, Cl, Br, $OCH_3$, $OC_2H_5$, $NH_2$, or $NH(C_{1-4}$-alkyl); and Z and $Z_1$ independently represent a fiber-reactive radical selected from the group consisting of pyridine, pyrimidine, pyridazine, pyrazine, oxazine or asymmetrical or symmetrical triazine ring, quinoline, phthalazine, cinnoline, quinazoline, quinoxaline, acridine, phenazine and phenanthridine heterocyclic rings to which at least one reactive substituent is bound, the reactive substituent being selected from the group consisting of halogen, ammonium, hydrazinium, pyridinium, picolinium, carboxypyridinium, sulfonium, sulfonyl, azido, thiocyanato, mercapto ether, hydroxy ether, sulfinic acid, and sulfonic acid.

2. Dyestuff mixtures according to claim 1, containing one or more dyestuffs of the formula $$Pc \begin{matrix} (SO_3H)_a \\ (SO_2NH_2)_b \\ (SO_2-NH-B-NHZ)_c \end{matrix} \quad (I)b$$

where
$B = C_{2-C_6}$-alkylene or phenylene,
$Z =$ fluoropyrimidyl, fluoropyrimidyl substituted by Cl or additional F
$a = 1.5$ to 3
$b = 0$ to 1.5
$c = 0.8$ to 2.0 and
$a+b+c = 3$ to 4.

3. Dyestuff mixtures according to claim 1, containing one or more dyestuffs I of the formula (III)

$$Pc \begin{matrix} (SO_3H)_a \\ (SO_2NH_2)_b \\ (SO_2-NH- \end{matrix} \underset{}{\underset{}{\bigcirc}} -NH-Z')_c$$

where
$Z' =$ is fluoropyrimidyl, or fluoropyrimidyl substituted by Cl or additional F and
$a = 1.5$ to 3
$b = 0$ to 1.5
$c = 0.8$ to 1.2 and
$a+b+c = 3$ to 4 and
one or more dyestuffs II of the formula (IV)

[structure of formula IV with substituents $(SO_3H)_{0-1}$, $R_5$, $(CH_2)_{0-1}$, $Z_1$, $SO_3H$, $R_7$, $(CH_2)_{0-1}-SO_3H$, HO, $R_6$, O]

where
$R_5 = H$, $C_1-C_4$-alkyl, Cl,
$R_6, R_7 = C_1-C_4$-alkyl.

4. Dyestuff mixtures according to claim 1, characterised in that
$R = H$, $CH_3$, $C_2H_5$.

5. Dyestuff mixtures according to claim 1, characterised in that Z, $Z_1$ are independently 5-chloro-2,6-difluoropyrimid-4-yl or 5-chloro-6-fluoropyrimid-4-yl.

6. Dyestuff mixtures according to claim 1, characterised in that the mixtures contain dyestuffs I and II as the only chromophoric reactive substances.

7. Dyestuff mixtures according to claim 1, characterised in that dyestuff I has one of the following formulae

[CuPc structure with $(SO_3H)_{2.3}$, $(SO_2NH_2)_{0.6}$, $(SO_2NH-$phenyl$-NH-$ chloro-fluoropyrimidyl$)_{1.0}$]

[NiPc structure with $(SO_3H)_{2.8}$, $(SO_2NH-$phenyl$-NH-$ chloro-fluoropyrimidyl$)_{1.0}$]

[CuPc structure with $(SO_3H)_{2.6}$, $(SO_2NH-CH_2CH_2-NH-$ triazinyl with $OCH_3$ and Cl$)_{1.2}$]

[CuPc structure with $(SO_3H)_{2.4}$, $(SO_2NH_2)_{0.5}$, $(SO_2NH-$phenyl$-NH-$ chloro-fluoropyrimidyl$)_{1.0}$]

[CuPc structure with $(SO_3H)_{2.0}$, $(SO_2NH_2)_{0.7}$, $(SO_2NH-$phenyl$-NH-$ triazinyl with $NH_2$ and Cl$)_{1.1}$]

[NiPc structure with $(SO_3H)_{2.8}$, $(SO_2NH-$phenyl$-NH-$ chloro-fluoropyrimidyl$)_{1.0}$]

and dyestuff II has one of the following formulae

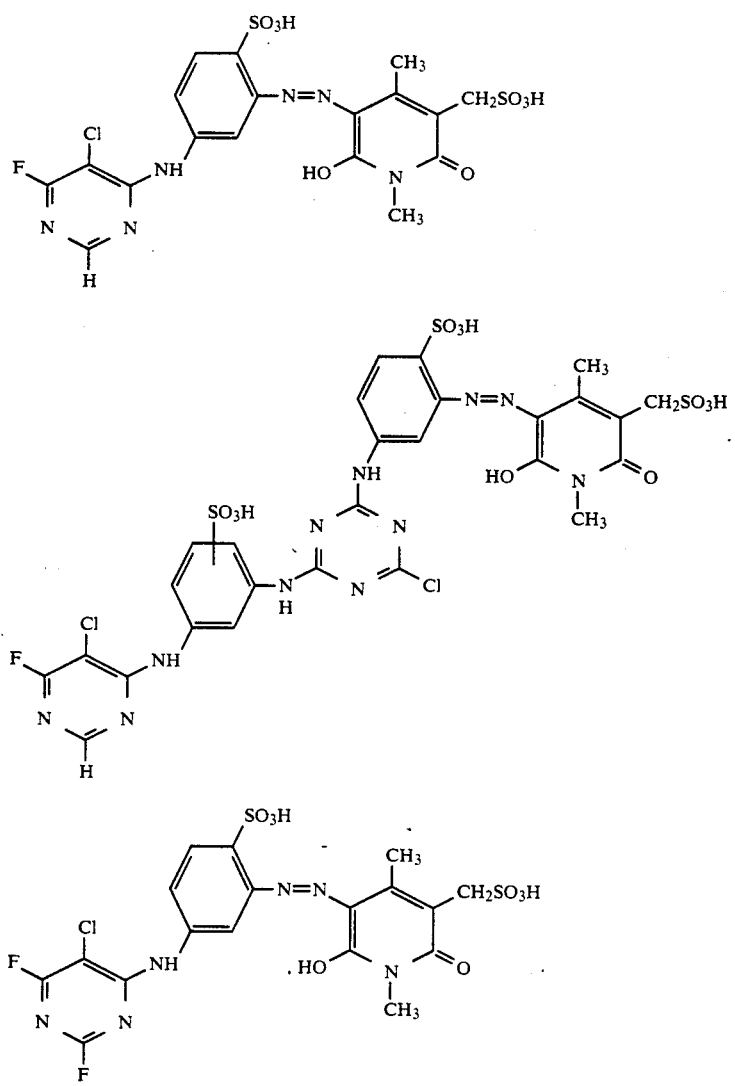

8. Dyestuff mixtures according to claim 1, characterised in that the weight ratio of dyestuffs I:II is 95:5 to 5:95.

9. The dyestuff mixture according to claim 1, wherein Z is bound to B via —NR— and $Z_1$ is bound to an aromatic C atom in D via —NR—.

10. The dyestuff mixture according to claim 1, wherein $Z^1$ is bound to an aromatic C atom in D via —CH$_2$—.

11. Process for the dyeing of hydroxyl- or amido-containing materials with a dyestuff mixture, characterised in that a mixture according to claim 1 is used.

* * * * *